Oct. 15, 1968     J. H. DE FREES     3,405,731
CONTROL VALVE FOR AN OUTLET PORT IN A FLUID STORAGE TANK
Filed Dec. 20, 1965
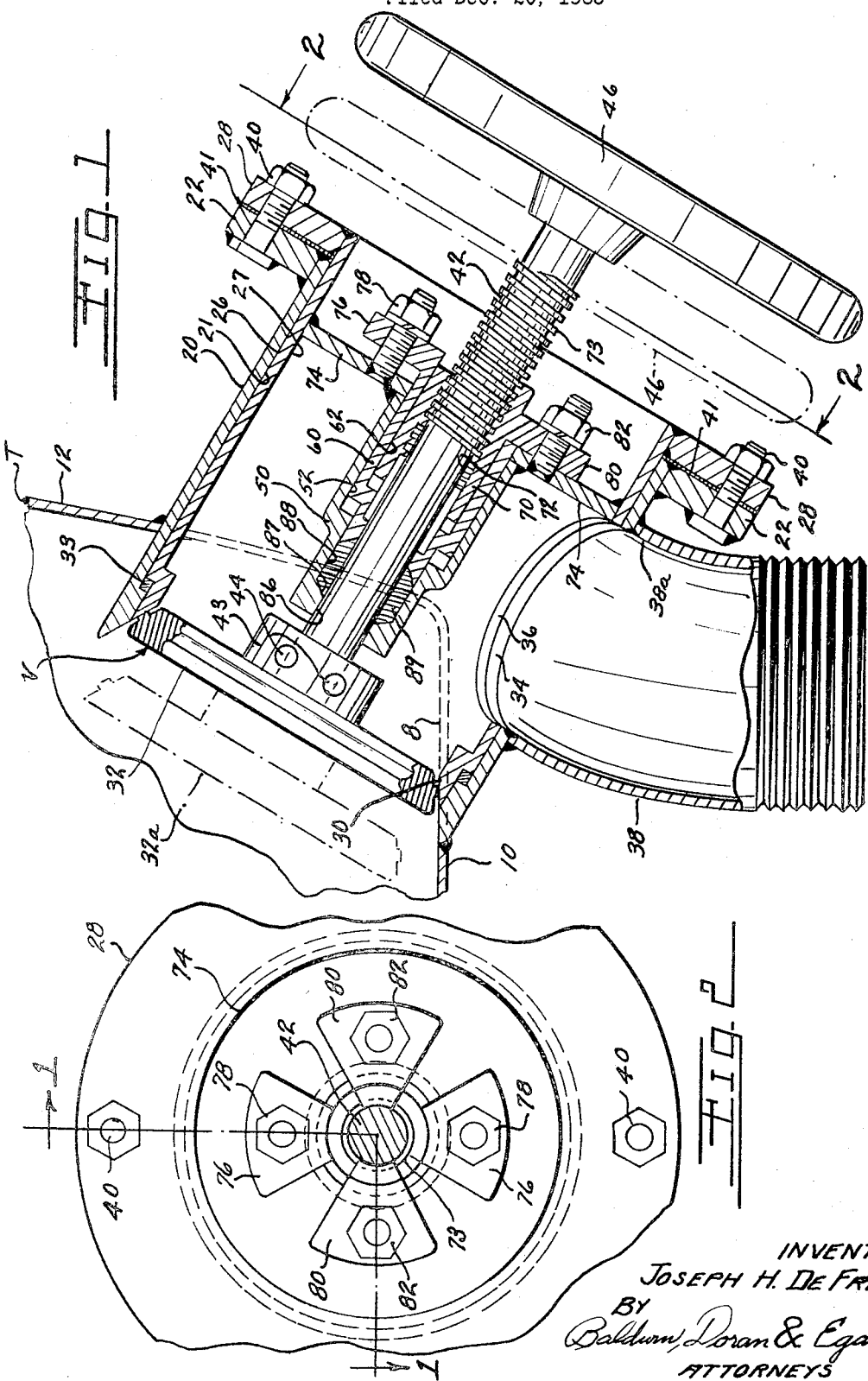
INVENTOR
JOSEPH H. DE FREES
BY
Baldwin, Doran & Egan
ATTORNEYS

United States Patent Office 3,405,731
Patented Oct. 15, 1968

3,405,731
CONTROL VALVE FOR AN OUTLET PORT IN A FLUID STORAGE TANK
Joseph H. De Frees, Warren, Pa., assignor to June De Frees Heelan, Moorestown, N.J.
Filed Dec. 20, 1965, Ser. No. 514,927
5 Claims. (Cl. 137—561)

ABSTRACT OF THE DISCLOSURE

A fluid discharge control valve for an outlet port in a fluid storage tank having a valve disc opening inwardly of the tank to penetrate the stored fluid. The valve is detachably secured in a valve body sleeve disposed in the tank floor to permit removal of the valve exteriorly of the tank. A valve stem is secured to the disc and extends outwardly of the tank, such stem being retained in position by a stem retaining means in the form of a three-section telescopic-nested structure including an outer gland housing, an intermediate gland telescoped into the gland housing, and a threaded flange nut telescoped into the gland and threadedly retaining the stem. The gland and flange nut are detachably secured to the gland housing enabling quick removal exteriorly of the tank for cleaning and repair purposes, such "gland-flange nut" structure effecting a substantially reduced overall length of the valve.

---

This invention relates to valves and more particularly to discharge or outlet valves used in connection with tanks or containers for the storage or transportation of liquids.

There has long been a need for a simple, efficient, outlet valve for liquid storage tanks handling asphalt, tar, and like products which thicken and partially congeal at normal temperatures. To establish adequate flow, such valve should open inwardly of the tank and penetrate the product. The valve per se, or in coaction with the tank, must not form any pockets where the product can congeal. Additionally, the valve must be removable exteriorly of the tank for purposes of cleaning and repair.

An object of the invention is to provide a liquid storage tank outlet valve which opens inwardly of the tank thereby penetrating the stored fluid to establish adequate drainage flow thereof.

A further object of the invention is to provide a valve of the above type removable from operative position exteriorly of the tank.

A further object of the invention is to provide a valve of the above type which does not form pockets in which the stored product may congeal.

A further object of the invention is to provide a valve of the above type that is simple in construction, inexpensive to manufacture, and highly effective in operation.

Briefly the foregoing objects are accomplished by the provision of a liquid storage tank outlet valve having a valve disc opening inwardly of the tank and off of the valve seat to penetrate the stored liquid. The valve is detachably secured in a valve body sleeve (disposed in the tank floor) to permit quick removal of the valve exteriorly of the tank. The sleeve, in the preferred form, is disposed at the juncture of the floor and rear wall of the tank and is positioned in the tank at a preferred angle of 30° to the horizontal to effect fast and complete drainage of the stored liquid. A seat sleeve is disposed in the body sleeve in telescopic relation therewith. Engagement of the valve disc with its valve seat is effected by rotating a threaded valve disc stem secured at one end to the disc and extending longitudinally through the valve body sleeve to the tank exterior, the outer end of the stem having a handwheel thereon for manual turning operation.

The stem is retained in position in the seat sleeve by a stem retaining means in the form of a three-section telescopic-nested structure including an outer gland housing secured to the inner longitudinal wall of the seat sleeve, an intermediate gland telescoped into the gland housing, and a threaded flange nut telescoped into the gland and threadedly retaining the stem. The gland and flange nut are detachably secured to the gland housing enabling quick removal for cleaning and repair purposes, such "gland-flange nut" structure effecting a substantially reduced overall length of the valve.

With the above construction, fast and complete drainage of slow flowing liquids from the tank is effected, such valve being quickly removable exteriorly of the tank. All parts of the valve may be quickly and easily disassembled for cleaning and repair.

Other objects and advantages of the invention will be apparent from the following description taken in conjunction with the drawings wherein:

FIG. 1 is a central sectional view of a valve, constructed in accordance with the invention, mounted in a liquid storage tank and taken along the line 1—1 of FIG. 2, the valve being shown in open position in dot-dash lines, and FIG. 2 is an end sectional view taken along the line 2—2 of FIG. 1.

Although the invention is shown and described herein with reference to fluid storage tank discharge valves, it will be understood that it may be employed on any type of valve for controlling the flow of fluids.

Referring to the drawings, there is shown a valve of the invention, generally designated as V, disposed in the outlet port of opening 8 of a liquid storage tank T, said tank having a horizontal floor 10 and a rear wall 12.

To provide fast flow when the tank is drained, the valve is disposed in outlet opening 8 (at the juncture of the floor 10 and rear wall 12 of the tank) at an angle of 20° to 40° to the horizontal, with an angle of 30° being preferred.

Disposed in the tank opening 8, at an angle of 30° to the horizontal, is an elongated cylindrical valve body sleeve 20 having an open-ended longitudinal bore 21 and having an annular peripheral body flange 22 extending outwardly from the lower portion thereof. Positioned within the bore 21, in coacting telescopic sealing relation therewith, is the valve V which includes an elongated cylindrical seat sleeve 26 having a longitudinal bore 27 and having an annular peripheral attaching flange 28 extending outwardly from the lower edge thereof. The seat sleeve 26 has an annular valve seat 30 formed on the upper edge thereof for selectively receiving the valve closing means in the form of the valve disc 32 thereon to open and close the valve as will later be described. Packing 33 is disposed between the sleeves to provide a fluid-tight seal therebetween. The sleeves 20 and 26 each have coacting aligned outlet orifices 34 and 36, respectively, disposed above or inwardly of the header plate 74, with an outlet nozzle 38 being secured to the sleeve 20 adjacent to and in alignment with such orifices. In the preferred form, to avoid the formation of pockets in which the stored product may accumulate and congeal, the nozzle wall 38a is disposed even with the header plate 74 and in direct alignment therewith. More specifically, the orifices 34 and 36 are disposed at the low point of the valve, with respect to the header plate, and are even therewith. The seat sleeve 26 may be detachably retained in the body sleeve 20 by any suitable means such as the bolts 40, which clamp together the respective sleeve flanges 22 and 28, there being a gasket 41 disposed therebetween.

Extending longitudinally through the seat sleeve bore 27 is the valve disc stem 42 which is connected at its inner upper end to the center of the valve disc 32 through the mounting collar 43 thereof by the attached pins 44. A handwheel 46 is secured to the lower outer end of the stem for manual rotation thereof.

The step 42 is retained in the seat sleeve bore 27 for selective adjustable longitudinal displacement therein by a stem mounting means formed of a three section telescopic nested structure including an outer cylindrical gland housing 50 having a longitudinal bore 52, an intermediate cylindrical gland 60 having a longitudinal bore 62 and telescopically disposed in the gland housing bore 52, and an inner cylindrical stem or flange nut 70 having an internally threaded longitudinal bore 72 (for receiving the threads 73 of the stem 42) and telescoped into the gland bore 62. The gland housing 50 has an annular peripheral header plate 74 extending outwardly from the lower edge thereof and secured to the longitudinal wall of the seat sleeve bore 27. The gland 60 has outwardly extending mounting flanges 76 detachably secured to the header plate 74 by the bolts 78. The flange nut 70 has outwardly extending mounting flanges 80 detachably secured to the header plate by the bolts 82.

The gland housing bore 52 has a restricted bore portion 86 forming an annular internal shoulder 87 forming a pocket 88 containing a hollow cylindrical gasket 89 which is biased against the shoulder 87 by the gland 60 (spaced from said shoulder) when the gland bolts 78 are tightened, thereby forming a seal encircling the stem 42 to prevent seepage of stored fluid downwardly past the stem to the valve exterior.

In operation, the valve disc 32 is lifted off of the seat 30 (inwardly into the tank T) to penetrate the stored fluid therein by circumferentially turning the handwheel 46 to move the disc 32 to the dot-dash position 32a shown in FIGURE 1. This permits stored fluid to flow from the tank interior, past the valve seat 30, through the outlets 34 and 36, and out the outlet nozzle 38. The entire valve V including the seat sleeve 26 may be removed from the tank (exteriorly thereof) by removing the clamping bolts 40. The valve itself is easily disassembled by simply removing the bolts 78 and 82.

As aforementioned, in the hauling of asphalt, tar, or like liquids which congeal or freeze at relatively low temperatures, it is advantageous, and in some cases a necessity, that the valve disc 32 move away from the seat 30 into the body of the tank. This action penetrates the solidified stored liquid or product and allows flow to start. Freezing or congealing of the product takes place early in the tank interior in the vicinity of the valve. This is caused by heat interiorly of the tank being conducted through the metal parts of the valve directly to the atmosphere.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

What is claimed is:

1. Fluid discharge control means for an outlet port in a fluid storage tank, said means comprising an elongated valve body sleeve having a bore open at both ends and longitudinally disposed in said port, a valve placeable in the body sleeve bore from the exterior of the tank and detachably secured in the bore in telescoping coacting sealing relation therewith for controlling fluid flow through said outlet port, detachable retaining means exteriorly of the tank for retaining the valve in the sleeve bore whereby the valve may be removed from the tank exteriorly thereof, said valve including a cylindrical seat sleeve having a bore open at both ends and detachably secured in the bore of the body sleeve in longitudinal telescopic sealing relation therewith, said seat sleeve having an annular valve seat at its inner end facing the tank interior, a valve disc selectively engageable with said seat for opening and closing said port, a valve disc stem secured to the disc and extending longitudinally outwardly through the seat sleeve bore, stem mounting means for retaining the stem in the bore for selective adjustable longitudinal displacement therein whereby the disc selectively engages the seat, said stem mounting means including an elongated cylindrical gland housing having an open-ended bore and longitudinally disposed in said seat sleeve bore, an elongated cylindrical stem gland having an open-ended bore and longitudinally disposed in said gland housing bore in telescopic relation therein, said stem gland being detachably secured to said gland housing, and an elongated cylindrical flange nut having an open-ended bore and longitudinally disposed in said stem gland bore in telescopic relation therein, said flange nut being detachably secured to said gland housing, said stem extending longitudinally through the flange nut bore and being threadedly secured to the longitudinal wall thereof for selective longitudinal displacement threthrough thereby enabling the valve disc to selectively engage said seat.

2. The structure of claim 1 wherein said gland housing has an annular peripheral header plate on the lower portion of such housing, said header plate being secured to the longitudinal wall of the seat sleeve bore, said gland housing and said flange nut being detachably secured to said header plate to effect removal of the same.

3. The structure of claim 2 wherein said valve body sleeve and said seat sleeve each have outlet orifices in coacting alignment above said header plate for draining the stored fluid through the outlet port and thence through said orifice.

4. The structure of claim 1 wherein said gland housing bore has a restricted bore portion forming an annular internal shoulder adjacent the inner upper end of the gland housing, the upper end of said stem gland being spaced from said shoulder to form a pocket, and a hollow cylindrical gasket disposed in said pocket and encircling the stem, said stem gland biasing said gasket against said shoulder whereby the gasket forms a seal around the stem to prevent seepage of stored fluid past the stem to the valve exterior.

5. Fluid discharge control means for an outlet port in a fluid storage tank, said means comprising an elongated valve body sleeve having a bore open at both ends and longitudinally disposed in said port, a valve placeable in the body sleeve bore from the exterior of the tank and detachably secured in the bore in telescoping coacting sealing relation therewith for controlling fluid flow through said outlet port, detachable retaining means exteriorly of the tank for retaining the valve in the sleeve bore whereby the valve may be removed from the tank exteriorly thereof, said body sleeve being disposed in said tank at the juncture of the floor and rear wall thereof, said sleeve extending upwardly into the tank at an angle of 20° to 40° to the horizontal to effect complete drainage of stored fluid from the tank, said valve including a cylindrical seat sleeve having a bore open at both ends and detachably secured in the body sleeve bore in longitudinal telescopic sealing relation therewith, said seat sleeve having an annular valve seat at its upper inner end facing the tank interior, a valve disc of less diameter than said body sleeve bore and selectively engageable with said seat for opening and closing said port, a valve stem secured to the disc and extending longitudinally outwardly through the seat sleeve bore, an elongated cylindrical gland housing having an open-ended bore and longitudinally disposed in said seat sleeve bore, an elongated cylindrical stem gland having an open-ended bore and longitudinally disposed in said gland housing bore in telescopic relation therein, said stem gland being detachably secured to said gland housing, an elongated cylindrical flange nut having an open-ended bore and longitudinally disposed in said stem gland bore in telescopic relation therein, said flange nut being detachably secured to said gland housing, said stem extending longitudinally through the flange nut bore and being threadedly secured to the longitudinal wall thereof for selective longitudinal displacement therethrough when the stem is circumferentially rotated about its longitudinal axis thereby enabling the valve disc to selectively engage said seat, said stem having a handwheel at its outer exterior end for manual rotation of the stem, said gland housing having an annular peripheral header plate on the lower portion of such housing, said header plate being secured to the longitudinal wall of the seat sleeve bore, said gland housing and said flange nut being detachably secured to said header plate to effect removal of the same, said valve body sleeve and said seat sleeve each having outlet orifices in coacting alignment above the header plate for draining the stored fluid through the outlet port and thence through said orifices, said gland housing bore having a restricted bore portion forming an annular internal shoulder adjacent the inner upper end of the gland housing, the upper end of said stem gland being spaced from said shoulder to form a pocket, and a hollow cylindrical gasket disposed in said pocket and encircling the stem, said stem gland biasing said gasket against said shoulder whereby the gasket forms a seal around the stem to prevent seepage of stored fluid past the stem to the valve exterior.

References Cited

UNITED STATES PATENTS

| | | | |
|---|---|---|---|
| 1,926,095 | 9/1933 | Graves | 251—148 XR |
| 2,479,997 | 8/1949 | Brown | 137—561 |
| 2,579,567 | 12/1951 | Greene | 251—144 XR |
| 2,982,299 | 5/1961 | Ksieski | 137—454.6 |

WILLIAM F. O'DEA, *Primary Examiner.*

HAROLD W. WEAKLEY, *Assistant Examiner.*